United States Patent
Tanaka (10) Patent No.: US 10,516,944 B2
(45) Date of Patent: Dec. 24, 2019

(54) SOUND OUTPUT APPARATUS AND SOUND OUTPUT METHOD

(71) Applicant: DENSO TEN Limited, Kobe-shi, Hyogo (JP)

(72) Inventor: Takashi Tanaka, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 0 days.

(21) Appl. No.: 16/242,701

(22) Filed: Jan. 8, 2019

(65) Prior Publication Data

US 2019/0320266 A1    Oct. 17, 2019

(30) Foreign Application Priority Data

Apr. 13, 2018  (JP) .................... 2018-077863

(51) Int. Cl.
*H04R 7/04* (2006.01)
*G06F 3/041* (2006.01)

(52) U.S. Cl.
CPC .......... *H04R 7/045* (2013.01); *G06F 3/0412* (2013.01); *G06F 3/0414* (2013.01); *H04R 2400/03* (2013.01); *H04R 2499/15* (2013.01)

(58) Field of Classification Search
CPC ............... H04R 7/045; H04R 2400/03; H04R 2499/15; G06F 3/0412; G06F 3/0414
USPC ........................................................ 381/152
See application file for complete search history.

(56) References Cited

U.S. PATENT DOCUMENTS

2018/0174597 A1*  6/2018  Lee ...................... H04R 29/005

FOREIGN PATENT DOCUMENTS

JP    2013-162167 A    8/2013

\* cited by examiner

*Primary Examiner* — Sean H Nguyen
(74) *Attorney, Agent, or Firm* — Oliff PLC (57) ABSTRACT

A sound output apparatus includes a touchscreen, a vibrator and a controller. The vibrator produces sound by causing vibration of the touchscreen based on a sound signal. The controller (a) performs a predetermined control of the sound signal while contact of an operation body with the touchscreen is being detected by the touchscreen, and (b) does not perform the predetermined control of the sound signal while contact of an operation body with the touchscreen is not detected by the touchscreen.

10 Claims, 7 Drawing Sheets

SOUND OUTPUT APPARATUS AND SOUND OUTPUT METHOD

BACKGROUND OF THE INVENTION

Field of the Invention

The invention relates to a technology that outputs sound by vibrating a touchscreen.

Description of the Background Art

Conventionally, there has been a sound output apparatus (input and output apparatus) that outputs sound by vibrating a display panel having a touchscreen (touch pad). Such a sound output apparatus is capable of simultaneously performing a function that outputs the sound by vibrating the display panel having the touchscreen (sound output function) and a function that detects a pressure on the display panel having the touchscreen (pressure detection function).

However, when the sound output function and the pressure detection function are performed at a same time, a detection accuracy of the pressure detection function may be lowered by vibrations of the sound output function. Moreover, while the sound output function is being performed, if an operator operates the display panel having the touchscreen, the operator may be given a strange haptic sense that is caused by the vibrations of the sound output function.

Moreover, a circuit configuration has been known that prevents the pressure detection accuracy of the pressure detection function from lowering due to the vibrations of the sound output function. However, such a circuit configuration is not capable of cancelling noise by use of a sound signal while the sound output function and the pressure detection function are being simultaneously performed. Thus, it is difficult to keep the pressure detection accuracy of the pressure detection function at a proper level.

SUMMARY OF THE INVENTION

According to one aspect of the invention, a sound output apparatus includes: a touchscreen; a vibrator that produces sound by causing vibration of the touchscreen based on a sound signal; and a controller that (a) performs a predetermined control of the sound signal while contact of an operation body with the touchscreen is being detected by the touchscreen, and (b) does not perform the predetermined control of the sound signal while contact of an operation body with the touchscreen is not detected by the touchscreen.

Thus, it is possible to reduce a case in which a strange haptic sense that an operator feels when pressing a touchscreen is given to the operator. The strange haptic sense is caused by vibrations of a touchscreen based on a sound signal.

According to another aspect of the invention, the sound output apparatus further includes: a pressure detector that detects a pressure applied to the touchscreen; and a circuit that superimposes, on a signal output by the pressure detector, i) a signal having an antiphase of the sound signal or ii) a signal having an antiphase of an adjusted sound signal obtained by adjusting the sound signal.

Thus, noise included in a voltage signal is cancelled so that it is possible to improve a detection accuracy of a pressure applied to a touchscreen display panel.

Therefore, an object of the invention is to curb a strange haptic sense that is caused by vibrations of a touchscreen based on a sound signal, and that is given to an operator when the operator presses the touchscreen.

These and other objects, features, aspects and advantages of the invention will become more apparent from the following detailed description of the invention when taken in conjunction with the accompanying drawings.

DESCRIPTION OF THE EMBODIMENTS

An example embodiment of the invention will be described below in detail with reference to the drawings.

<1. Configuration Example of Sound Output Apparatus>

Figure 1:
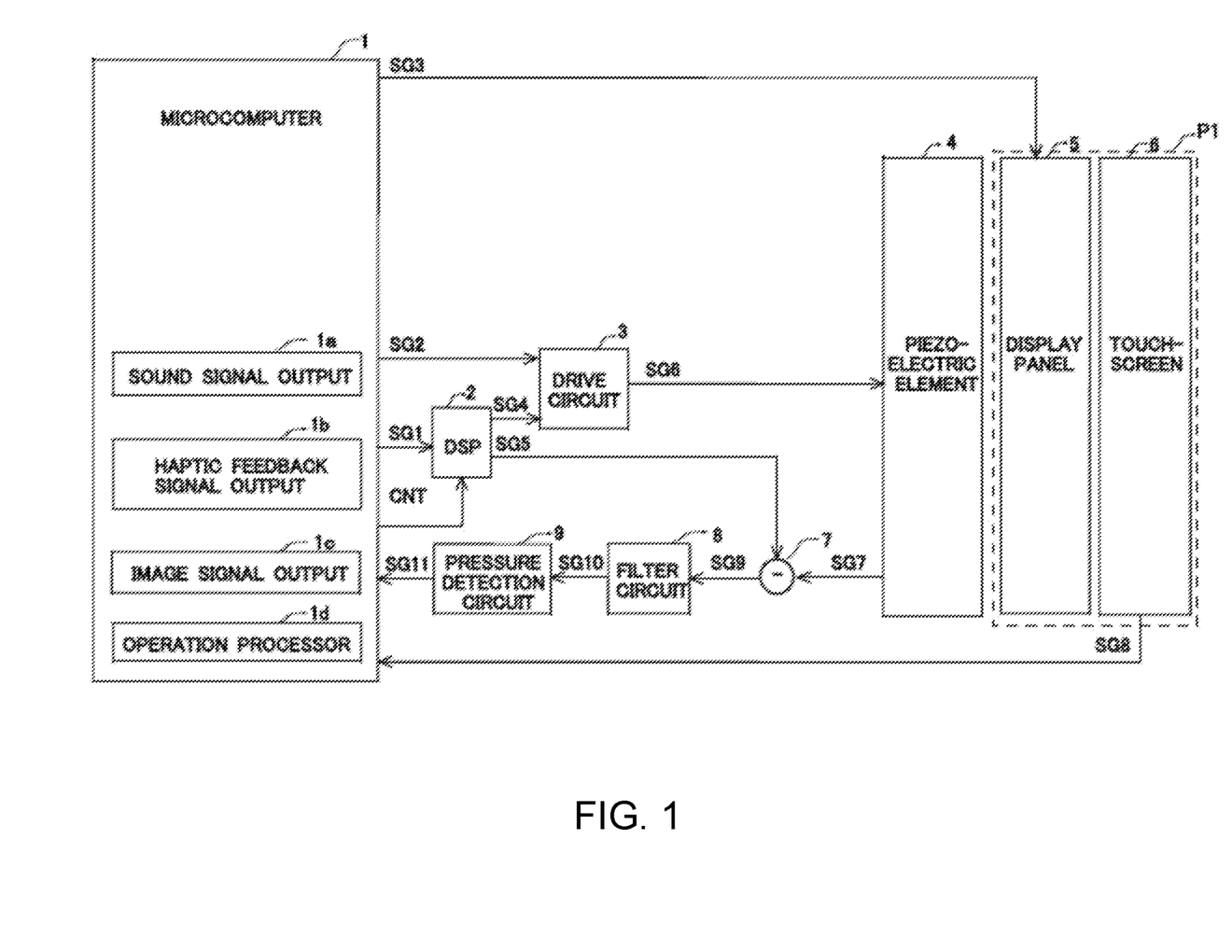
FIG. 1 illustrates a configuration example of a sound output apparatus.

FIG. 1 illustrates a configuration example of a sound output apparatus. The sound output apparatus shown in FIG. 1 includes a microcomputer 1, a digital signal processor (hereinafter, "DSP") 2, a drive circuit 3, a piezoelectric element 4, a display panel 5, a touchscreen 6, a subtractor 7, a filter circuit 8, and a pressure detection circuit 9. A display panel having a touchscreen (hereinafter, "touchscreen display panel") P1 includes the display panel 5 and the touchscreen 6. The display panel 5 and the touchscreen 6 are layered on each other.

The sound output apparatus shown in FIG. 1 includes a function of outputting sound by vibrating the touchscreen display panel P1 (sound output function), a function of detecting a pressure on the touchscreen display panel P1 (pressure detection function), and a function of providing a response (feedback) of a vibration haptic sense, to an operating body, such as a finger of an operator and a stylus pen (haptic feedback function), when the pressure and the like on the touchscreen display panel P1 is detected.

The microcomputer 1 controls the entire sound output apparatus shown in FIG. 1. The microcomputer 1 includes a CPU (Central Processing Unit), a memory, etc. as hardware.

The microcomputer 1 includes a sound signal output 1a, a haptic feedback signal output 1b, an image signal output 1c, and an operation processor 1d, all of which function as software.

The sound signal output 1a outputs a sound signal SG1 to the DSP 2. The sound signal SG1 may be generated by the sound signal output 1a or may be obtained by the sound signal output 1a from an outside of the microcomputer 1.

The haptic feedback signal output 1b generates a haptic feedback signal SG2 based on a result of a process performed by the operation processor 1d, and outputs the haptic feedback signal SG2 to the drive circuit 3.

The image signal output c outputs an image signal SG3 to the display panel 5. The image signal SG3 may be generated by the image signal output c or may be obtained by the image signal output 1c from an outside of the microcomputer 1.

The operation processor 1d recognizes an input operation based on a detection signal SG8 that is output from the touchscreen 6 and on a detection signal SG11 that is output from the pressure detection circuit 9. The operation processor 1d performs a process based on the input operation. For example, in a case where the input operation is the pressure on the display panel 5, the operation processor 1d provides, to the haptic feedback signal output 1b, an instruction to generate and output the haptic feedback signal SG2.

The DSP 2 performs a variety of signal processes for the sound signal SG1 to change quality of sound that is output from the sound output apparatus shown in FIG. 1. For example, the DSP 2 includes an equalizer function that changes a frequency characteristic of a sound signal. The DSP 2 performs a variety of signal processes for the sound signal SG1 to convert the sound signal SG1 into a sound signal SG4, and then outputs the sound signal SG4 to the drive circuit 3.

Moreover, the DSP 2 generates a noise cancel sound signal SG5 based on the sound signal SG1, and then outputs the noise cancel sound signal SG5 to the subtractor 7. Details of the noise cancel sound signal SG5 will be described later.

The drive circuit 3 includes a first D/A converter, a second D/A converter, a superimposing circuit, and an amplifier. Being different from this embodiment, the first D/A converter may be provided to the microcomputer 1, and the drive circuit 3 may be configured to receive the haptic feedback signal SG2 that is an analogue signal. Moreover, being different from this embodiment, the second D/A converter may be provided to the DSP 2, and the drive circuit 3 may be configured to receive the sound signal SG4 that is an analogue signal.

The first D/A converter of the drive circuit 3 converts the haptic feedback signal SG2 from a digital signal into the analogue signal. The second D/A converter of the drive circuit 3 convers the sound signal SG4 from a digital signal into the analogue signal. The superimposing circuit of the drive circuit 3 superimposes the analogue signal output from the first D/A converter of the drive circuit 3 on the analogue signal output from the second D/A converter of the drive circuit 3, to generate a superimposed analogue signal.

In a case where the sound signal SG1 is output but the haptic feedback signal SG2 is not output from the microcomputer 1, the superimposed analogue signal is equivalent to the analogue signal output from the second D/A converter of the drive circuit 3. Moreover, in a case where the haptic feedback signal SG2 is output but the sound signal SG1 is not output from the microcomputer 1, the superimposed analogue signal is equivalent to the analogue signal output from the first D/A converter of the drive circuit 3. In a case where neither the sound signal SG1 nor the haptic feedback signal SG2 is output from the microcomputer 1, no superimposed analogue signal is output.

The amplifier of the drive circuit 3 amplifies the superimposed analogue signal generated by the superimposing circuit of the drive circuit 3 to generate a drive signal SG6. The amplifier then outputs the drive signal SG6 to the piezoelectric element 4.

A number of the piezoelectric elements 4 may be one or more. The piezoelectric element 4 is arranged on a back surface (surface opposite to the operator) of the display panel 5, and is fixed to the touchscreen display panel P1. In this embodiment, the piezoelectric element 4 is fixed to the back surface of the display panel 5 by use of, for example, adhesive. The piezoelectric element 4 vibrates the touchscreen display panel P1 in accordance with the drive signal SG6. Thus, the sound output function and the haptic feedback function are available. In other words, the piezoelectric element 4 is an example of vibrators that produce sound by causing vibration of the touchscreen display panel P1 based on the sound signal SG4.

The piezoelectric element 4 as described above is fixed to the touchscreen display panel P1 so that when the touchscreen display panel P1 is pressed, the piezoelectric element 4 receives a pressure. The piezoelectric element 4 outputs, to the subtractor 7, a voltage generated in accordance with the pressure applied to the piezoelectric element 4, as a voltage signal SG7. In other words, the piezoelectric element 4 is an example of pressure detectors that detect a pressure applied to the touchscreen display panel P1.

The display panel 5 is, for example, an organic EL (Electro Luminescence) panel. The organic EL panel is bendable in a film form. The display panel 5 displays an image based on the image signal SG3.

The touchscreen 6 is arranged to a front side (side of the operator) of the display panel 5. In order to improve visibility of the images displayed on the display panel 5, OCA (Optical Clear Adhesive) or OCR (Optical Clear Resin) may be provided between the display panel 5 and the touchscreen 6.

The touchscreen 6 outputs the detection signal SG8 to the microcomputer 1. The detection signal SG8 is indicative of a contact state of the operating body, and includes information of presence or absence of contact of the operating body with the touchscreen 6. Moreover, in a case where the operating body contacts the touchscreen 6, the detection signal SG8 includes information of a contact position of the operating body.

A detection method for the touchscreen 6 is not especially defined here. However, it is recommended that the touchscreen 6 should be a capacitive touchscreen because if the touchscreen 6 is a capacitive touchscreen, it is possible to detect not only contact but also an approach of the operating body to the touchscreen 6. In a case where the touchscreen 6 is the capacitive touchscreen, the detection signal SG8 is indicative of an approaching state of the operating body to the touchscreen 6, in addition to the contact state of the operating body with the touchscreen 6. In this case, the detection signal SG8 includes information of presence or absence of the approach of the operating body to the touchscreen 6. Moreover, in a case where the operating body is approaching the touchscreen 6, the detection signal SG8 includes information of an approaching position of the operating body.

The subtractor 7 includes a third D/A converter and a subtraction circuit. Being different from this embodiment, the third D/A converter may be provided to the DSP 2, and the subtractor 7 may receive the noise cancel sound signal SG5 that is an analogue signal.

The third D/A converter of the subtractor 7 converts the noise cancel sound signal SG5 from a digital signal into an analogue signal. The subtraction circuit of the subtractor 7 subtracts, from the voltage signal SG7, the noise cancel sound signal SG5 converted into the analogue signal to generate a voltage signal SG9, and then the subtraction circuit of the subtractor 7 outputs the voltage signal SG9 to the filter circuit 8.

The filter circuit 8 lowers a predetermined band of the voltage signal SG9 to generate a voltage signal SG10, and then outputs the voltage signal SG10 to the pressure detection circuit 9.

The pressure detection circuit 9 detects the pressure on the touchscreen display panel P1 based on the voltage signal SG10, and then outputs, to the microcomputer 1, the detection signal SG11 that is a result of the detection. The pressure detection circuit 9 may be configured with, for example, a comparator. In a case where the pressure detection circuit 9 is configured with the comparator, the pressure detection circuit 9 compares a level of the voltage signal SG10 to a predetermined threshold voltage by use of the comparator. In a case where the level of the voltage signal SG10 is greater than a predetermined threshold voltage Vth (see FIG. 3 described later), the pressure detection circuit 9 determines that the detection signal SG11 is a high level voltage signal. In a case the level of the voltage signal SG10 is equal to or smaller than the predetermined threshold voltage Vth, the pressure detection circuit 9 determines that the detection signal SG11 is a low level voltage signal. In a case where the detection signal SG11 is the high level voltage signal, the detection signal SG11 indicates that the pressure on the touchscreen display panel P1 is being detected. On the other hand, in a case where the detection signal SG11 is the low level voltage signal, the detection signal SG11 indicates that no pressure on the touchscreen display panel P1 is being detected.

<2. Behavior Example of the Sound Output Apparatus>

Figure 2:
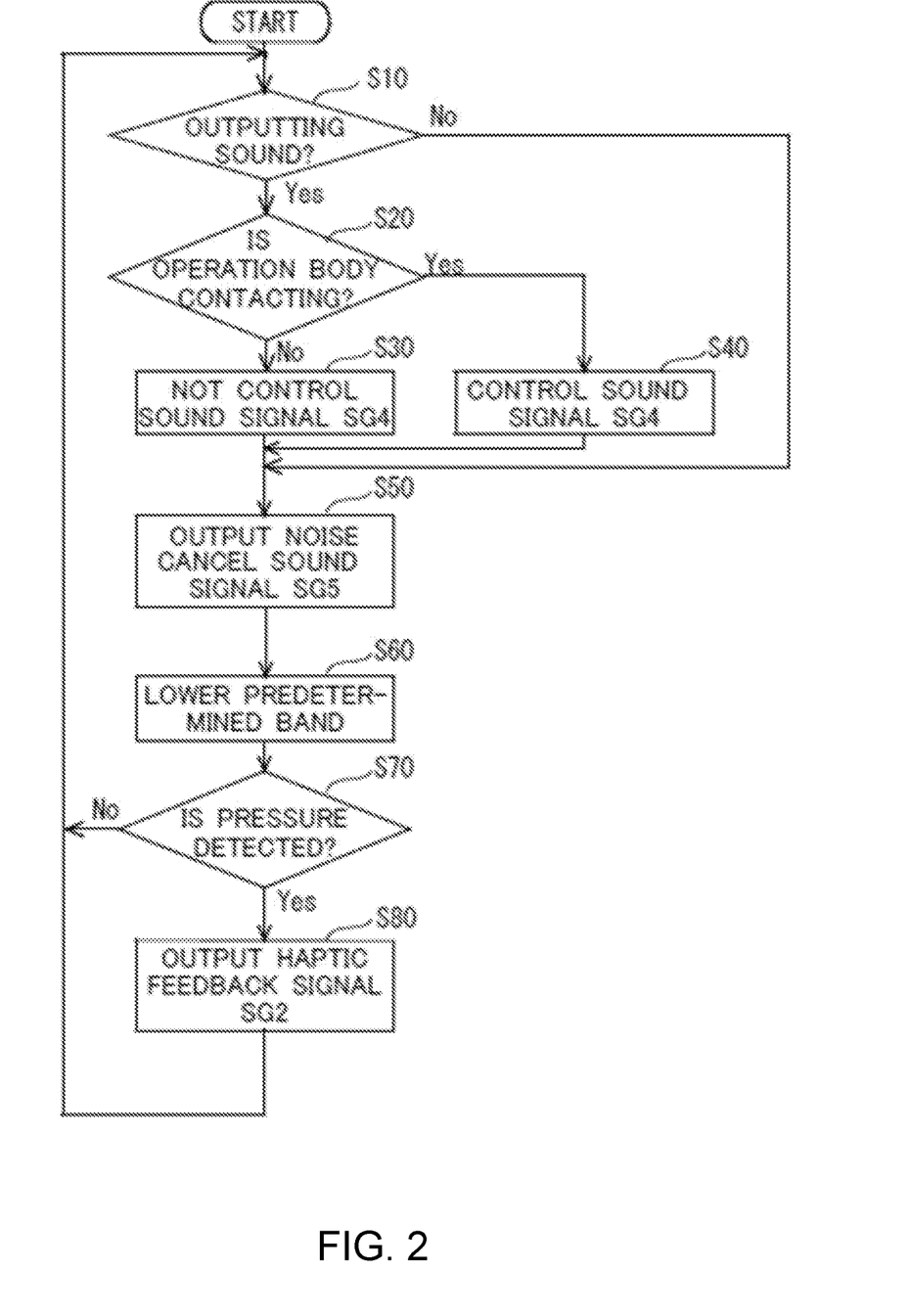
FIG. 2 is a flowchart showing a behavior example of the sound output apparatus.
Figure 3:
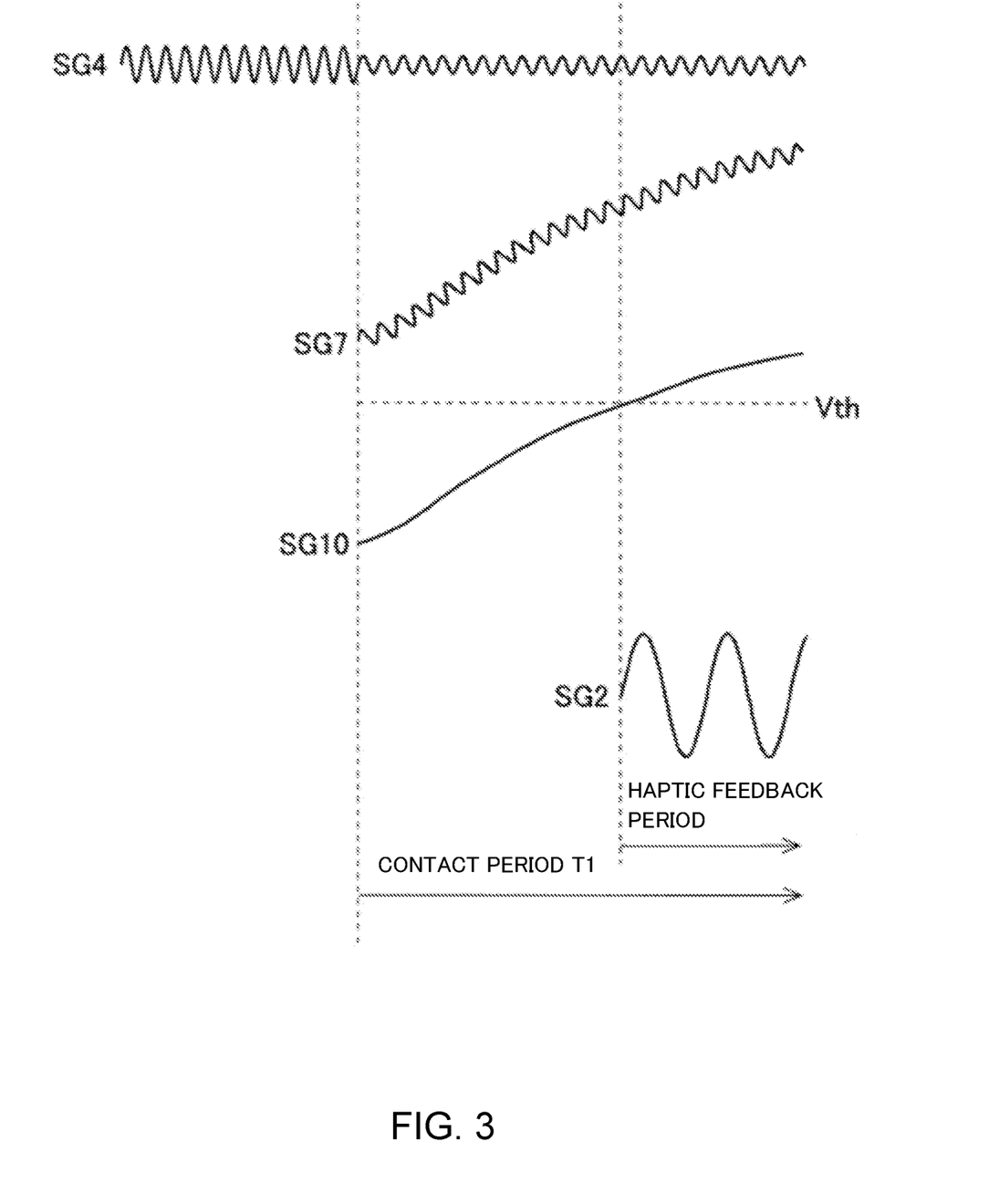
FIG. 3 is a schematic timing chart showing an example of signal waves.

FIG. 2 is a flowchart showing a behavior example of the sound output apparatus shown in FIG. 1. FIG. 3 is a schematic timing chart showing an example of signal waves. FIG. 3 is the timing chart showing a time period in which the sound output apparatus in FIG. 1 is outputting sound. The timing chart shows the time period: first, the operating body is not in the contact state with the touchscreen 6; and then the operating body is in the contact state, and the pressure on the touchscreen display panel P1 is detected; and finally a response of the haptic sense is given to the operating body.

In the flowchart of FIG. 2, first, the microcomputer 1 determines whether or not the sound output apparatus shown in FIG. 1 is outputting sound (a step S10). When the sound signal output 1a is outputting the sound signal SG1 to the DSP 2, the sound output apparatus shown in FIG. 1 is outputting sound. On the other hand, when the sound signal output 1a is not outputting the sound signal SG1 to the DSP 2, the sound output apparatus shown in FIG. 1 is not outputting sound.

In a case where the microcomputer 1 determines that the sound output apparatus shown in FIG. 1 is not outputting sound (No in the step S10), the flowchart moves to a step S50 described later.

On the other hand, in a case where the microcomputer 1 determines that the sound output apparatus shown in FIG. 1 is outputting sound (Yes in the step S10), the operation processor 1d determines, based on the detection signal SG8 output from the touchscreen 6, whether or not the operating body is contacting the touchscreen 6 (a step S20).

In a case where the operation processor 1d determines that the operating body is not contacting the touchscreen 6 (No in the step S20), the DSP 2 outputs the sound signal SG4 to the drive circuit 3 without controlling the sound signal SG4 (a step S30).

On the other hand, in a case where the operation processor 1d determines that the operating body is contacting the touchscreen 6 (Yes in the step S20), the DSP 2 controls the sound signal SG4, and then outputs the sound signal SG4 to the drive circuit 3 (a step S40). In this embodiment, in the case where the operation processor 1d determines that the operating body is contacting the touchscreen 6, the operation processor 1d outputs, to the DSP 2, a control signal CNT to control the sound signal SG4. The control of the sound signal SG4 may be any control if the control can reduce a case in which the strange haptic sense (uncomfortable haptic sense) caused by the vibrations caused by the sound output function is given to the operator. In a contact period T1 (a time period in which the operating body is contacting the touchscreen 6) shown in FIG. 3, it is possible to reduce the case in which the strange haptic sense caused by the vibrations caused by the sound output function is given to the operator.

For example, the DSP 2 may control to reduce all bands of the sound signal SG4. Thus, the vibrations of the touchscreen display panel P1 caused in accordance with the drive signal SG6 become smaller in all bands. Therefore, it is possible to reduce the case in which the strange haptic sense caused by the vibrations caused by the sound output function is given to the operator. Here, reducing the all bands of the sound signal SG4 means reducing a level of the sound signal SG4 in the all bands as compared to a case in which control is not performed.

Moreover, for example, the DSP 2 may lower at least a first band of the sound signal SG4. Thus, since vibrations of the touchscreen display panel P1 in accordance with the drive signal SG6 become smaller in the first band, it is possible to reduce the case in which the strange haptic sense caused by the vibrations caused by the sound output function is given to the operator. Moreover, since bands other than the first band of the sound signal SG4 are not lowered, it is possible to prevent sound output from becoming smaller. Here, lowering the first band of the sound signal SG4 means reducing a level of the first band of the sound signal SG4, as compared to the case in which the control is not performed.

Figure 4:
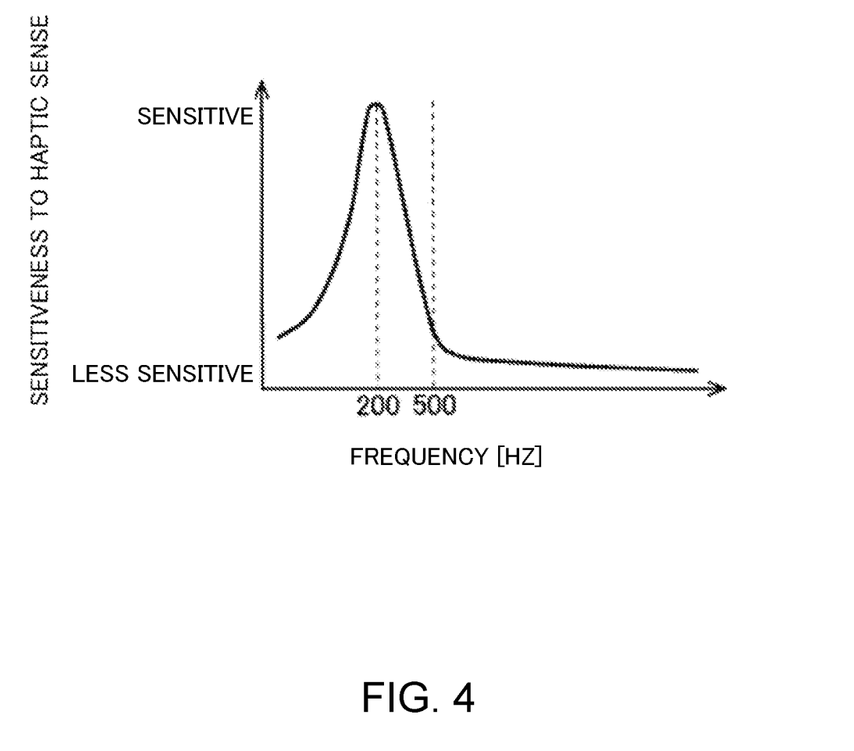
FIG. 4 illustrates a frequency characteristic that a sensory receptor of a finger of a human being has.

A sensory receptor of a finger of a human being has a frequency characteristic shown in FIG. 4. Therefore, it is recommended that the first band should be equal to or less than 500 Hz. If the first band is equal to or less than 500 Hz, it is possible to effectively reduce the case in which the strange haptic sense caused by the vibrations caused by the sound output function is given to the operator. In this embodiment, the first band is equal to or less than 500 Hz. However, the first band may be any band if the band includes a proximity of 200 Hz, a substantially peak frequency characteristic of a finger, e.g., 300 Hz or less. Moreover, for example, the first band may be a band including 100 Hz below and above the proximity of 200 Hz (band from approx. 100 Hz to approx. 300 Hz).

Further, for example, the DSP 2 may amplify at least a second band of the sound signal SG4. Thus, since vibrations of the touchscreen display panel P1 caused in accordance with the drive signal SG6 become greater in the second band, it is possible to compensate reduction in vibrations of the touchscreen display panel P1 caused by contact of the operating body. Moreover, since bands other than the second band of the sound signal SG4 are not amplified, it is possible to prevent the strange haptic sense from increasing. Here, amplifying the second band of the sound signal SG4 means amplifying the level of the sound signal SG4 in the second band, as compared to the case in which the control is not performed. Further, an amplification amount for the second band may be changed in accordance with, for example, at least one of i) the level of the voltage signal SG 10, and ii) the information of the contact position included in the detection signal SG8. In this case, the DSP 2 may be configured to receive at least one of the voltage signal SG10 and the detection signal SG8, or may be configured to receive an instruction relating to the amplification amount for the second band, from the microcomputer 1.

It is recommended that the second band should not include a band equal to or less than 500 Hz. If the second band does not include 500 Hz, a band increases in which the sensory receptor of a finger of a human being is less sensitive to a haptic sense. Thus, an increase in the strange haptic sense is effectively controlled. In this embodiment, the second band is greater than 500 Hz. However, it may be any band, for example, a band equal to or less than 300 Hz, if the band does not include the proximity of 200 Hz, the substantially peak frequency characteristic of a finger. Moreover, for example, the second band may be a band not including 100 Hz below and above the proximity of 200 Hz (a band from 0 Hz to approx. 100 Hz, and a band of approx. 300 Hz and above).

The band frequency described above does not mean that the band strictly includes no frequency outside the band, but means that signal levels in frequencies outsides the band are attenuated to a level that has no substantial effect, for example, a 3 dB bandwidth or a 6 dB bandwidth that are commonly used in electronics and a communication engineering.

In a step S50 following the steps S30 and S40, the DSP 2 outputs the noise cancel sound signal SG5. After the step S50, the flowchart moves to a step S60. Being different from the embodiment, in a case where the step S30 is performed, the flowchart may move directly to the step S60 without performing the step S50.

The noise cancel sound signal SG5 is a signal same as the sound signal SG4 or an adjusted sound signal (including a signal identical to the sound signal SG4 except for gain) that is obtained by adjusting the sound signal SG4. Therefore, a signal having an antiphase of the sound signal SG4 or a signal having antiphase of the adjusted sound signal obtained by adjusting the sound signal SG4 is superimposed, by the subtractor 7, on the voltage signal SG7 output from the piezoelectric element 4, the pressure detector. Thus, noise (noise caused by the vibrations caused based on the sound signal SG4) included in the voltage signal SG7 is cancelled. Therefore, it is possible to improve an accuracy of detecting a pressure applied to the touchscreen display panel P1.

Figure 5:
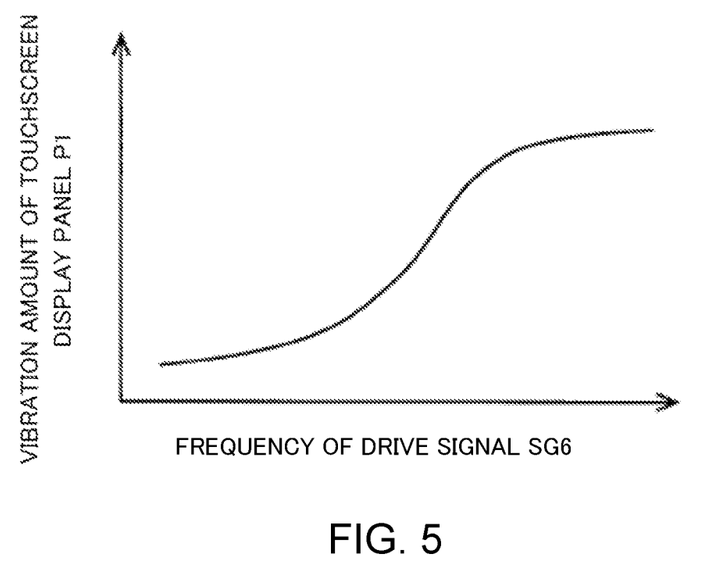
FIG. 5 illustrates an example of a vibration characteristic of a touchscreen display panel.
Figure 6:
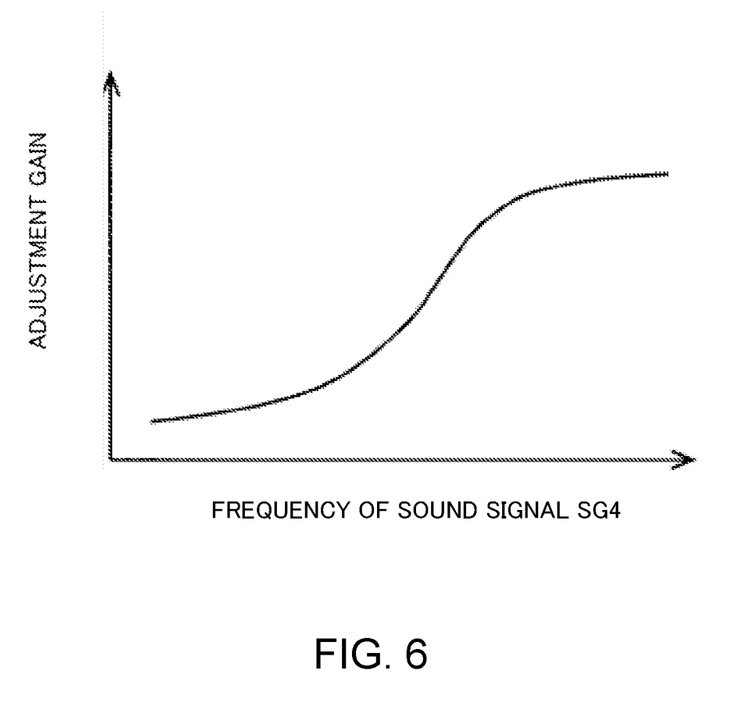
FIG. 6 illustrates an example of a frequency characteristic of an adjustment gain.

In a case where a level of the drive signal SG6 is constant, a vibration amount of the touchscreen display panel P1 normally varies depending on frequency of the drive signal SG6, as shown in an example in FIG. 5. Therefore, it is recommended that the adjusted sound signal should be obtained by adjusting the sound signal SG4 in accordance with a vibration characteristic of the touchscreen display panel P1. Thus, an accuracy of cancelling the noise is improved. In a case where the vibration characteristic of the touchscreen display panel P1 is as shown in FIG. 5, the DSP 2 may generate the adjusted sound signal by multiplying the sound signal SG4 generated in the DSP 2 by an adjustment gain having the frequency characteristic as shown in FIG. 6. The DSP 2 may store the frequency characteristic of the adjustment gain in a form of a relational expression or a data table, in a nonvolatile memory. It is recommended that information stored in the nonvolatile memory by the DSP 2 should be rewritten from an outside of the DSP 2.

In the step S60, the filter circuit 8 lowers the predetermined band of the voltage signal SG9 output from the subtractor 7. The predetermined band is unnecessary band for the detection of the pressure on the touchscreen display panel P1. For example, the predetermined band may be same as a band of vibrations (e.g., 200 Hz or greater) of the touchscreen display panel P1 caused in accordance with the drive signal SG6.

The sound output apparatus shown in FIG. 1 has the configuration that includes the subtractor 7 and the filter circuit 8. However, even if the sound output apparatus includes only one of the subtractor 7 and the filter circuit 8, it is possible to improve the accuracy of detecting the pressure applied to the touchscreen display panel P1. Therefore, being different from this embodiment, the sound output apparatus may have a configuration that includes only one of the subtractor 7 and the filter circuit 8.

In a step S70 following the step S60, the pressure detection circuit 9 determines, based on the voltage signal SG10 output from the filter circuit 8, whether or not a pressure on the touchscreen display panel P1 is being detected.

In a case where the pressure detection circuit 9 determines that the pressure on the touchscreen display panel P1 is not detected (No in the step S70), the flowchart moves back to the step S10. On the other hand, in a case where the pressure detection circuit 9 determines that the pressure on the touchscreen display panel P1 is being detected (Yes in the step S70), the haptic feedback signal output 1b outputs the haptic feedback signal SG2 to the drive circuit 3, based on the instruction from the operation processor 1d (a step S80). After the step S80, the flowchart moves back to step S10.

<4. Notes>

In addition to the foregoing embodiment, various changes may be added to the technical characteristics and features disclosed in this embodiment without departing from a purpose of the technical characteristics and features. In other words, the foregoing embodiment is an example in all aspects. Therefore, the foregoing embodiment is not intended to limit the technical scope. The technical scope of the invention is defined by claims, not by the embodiment described above. Thus, the claims, equivalent thereof, and all possible changes in the scope defined by the claims should be included in the technical scope of the invention.

Figure 7:
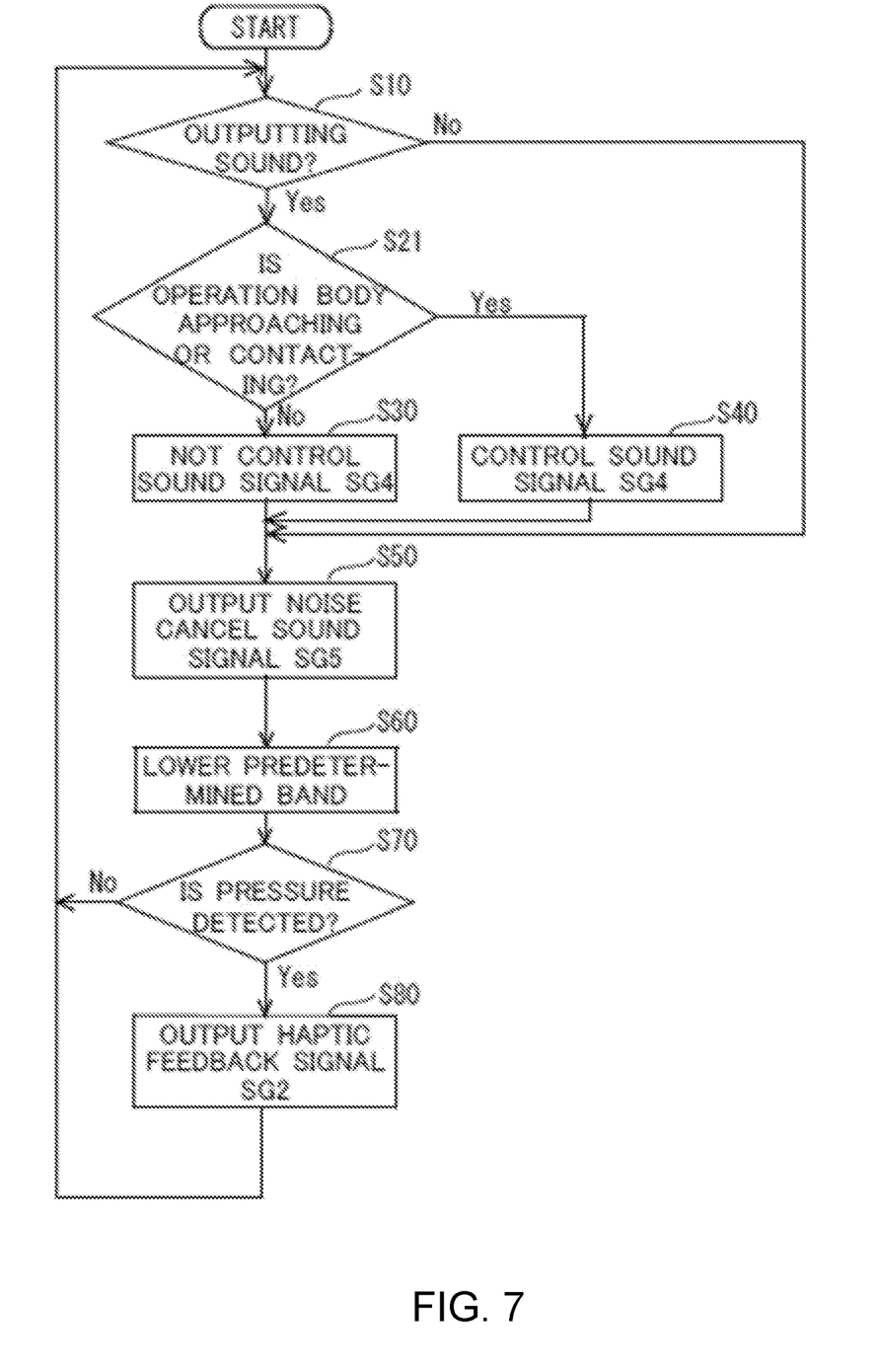
FIG. 7 is a flowchart showing a behavior example of the sound output apparatus.

For example, in a case where the touchscreen 6 is capable of detecting an approach of the operating body to the touchscreen 6, the sound output apparatus shown in FIG. 1 may work, for example, as shown in a flowchart in FIG. 7. The flowchart in FIG. 7 is basically same as the flowchart shown in FIG. 3, but the step S20 of the flowchart in FIG. 3 is replaced by a step S21 of the flowchart in FIG. 7.

In the step S21, the operation processor 1d determines, based on the detection signal SG8 output from the touchscreen 6, whether or not the operating body is approaching or contacting the touchscreen 6.

Figure 8:
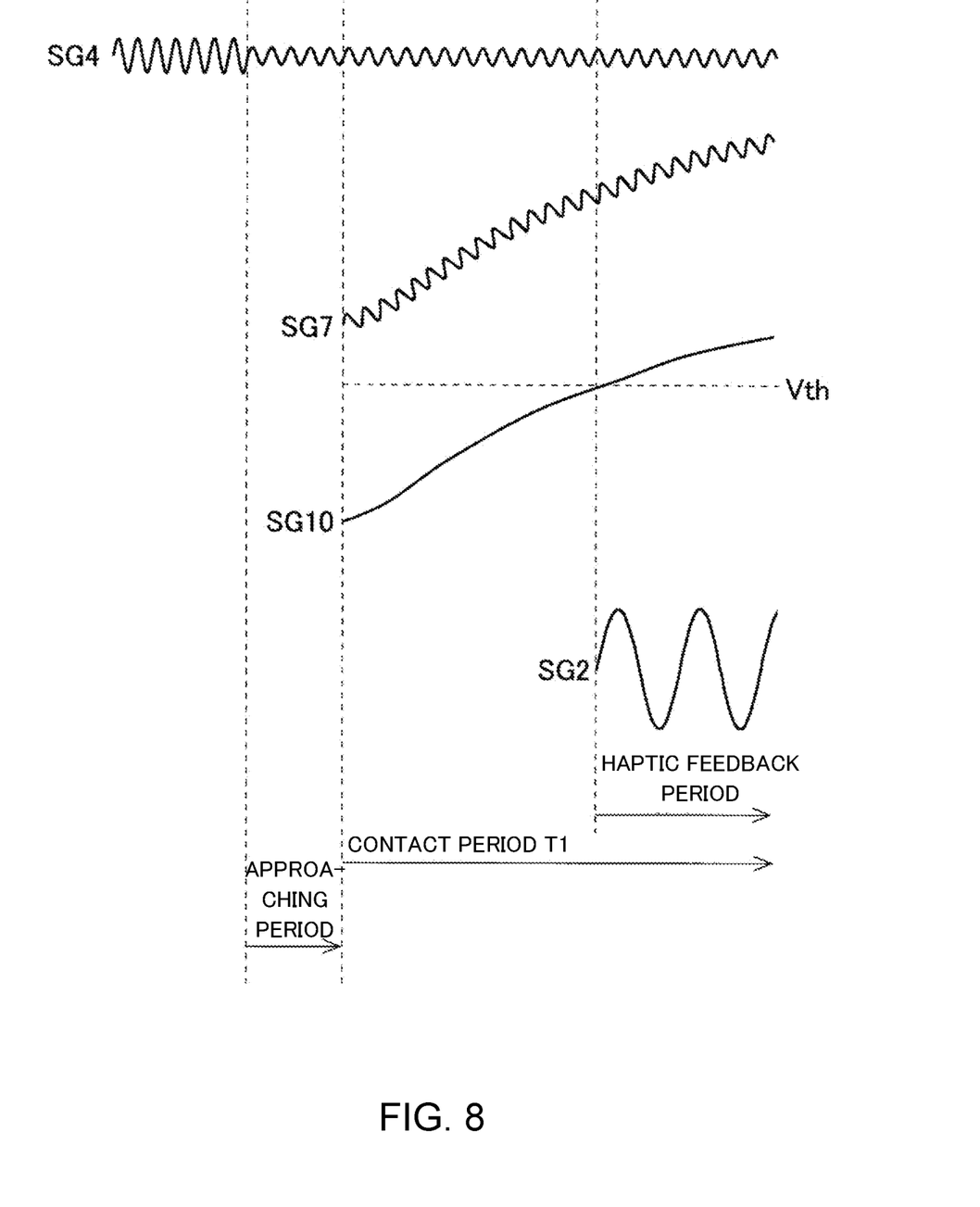
FIG. 8 is a schematic timing chart showing an example of the signal waves.

In a case where the operation processor 1d determines that the operating body is not approaching and also not contacting the touchscreen 6 (No in the step S21), the flowchart moves to the step S30. On the other hand, in a case where the operation processor 1d determines that the operating body is approaching or contacting the touchscreen 6 (Yes in the step S21), the flowchart moves to the step S40. Therefore, in a case where the sound output apparatus shown in FIG. 1 performs the steps of the flowchart in FIG. 7, the sound signal SG4 is started to be controlled before the operating body contacts the touchscreen 6 as shown in FIG. 8.

In a case where the sound output apparatus shown in FIG. 1 performs the steps of the flowchart in FIG. 3, there is a small delay (or a gap) between a time point at which the operating body contacts the touchscreen 6 and a time point at which the sound signal SG4 is started to be controlled.

Therefore, there is a time period, though the time period is very short, in which it is impossible to reduce the case in which the strange haptic sense that is caused by the vibrations caused by the sound output function is given to the operator. On the other hand, in a case where the sound output apparatus in FIG. 1 performs the steps of the flowchart in FIG. 7, it is possible to eliminate the time period in which it is impossible to reduce the case in which the strange haptic sense that is caused by the vibrations caused by the sound output function is given to the operator in a case of the flowchart in FIG. 3.

The sound output apparatus shown in FIG. 1 may omit the step S40 shown in FIG. 2 or FIG. 7. In this case, it is impossible to produce the effect in reducing the case in which the strange haptic sense that is caused by the vibrations caused by the sound output function is given to the operator. However, it is possible to produce an effect in improving the accuracy of detecting a pressure applied to the touchscreen display panel P1.

A first mode and a second mode may be provided: In the first mode, the step S40 shown in FIGS. 2 and 7 is performed, and in the second mode, the step S40 shown in FIGS. 2 and 7 is not performed. The first mode or the second mode may be chosen by an operation with the sound output apparatus shown in FIG. 1.

In the embodiment, the piezoelectric element 4 functions as the vibrator that produces sound by causing vibrations of the touchscreen display panel P1 based on the sound signal SG4, and also functions as the pressure detector that detects a pressure applied to the touchscreen display panel P1. However, different parts may be provided for the vibrator that produces sound by causing vibration of the touchscreen display panel P1 based on the sound signal SG4, and for the pressure detector that detects the pressure applied to the touchscreen display panel P1. For example, a vibration solenoid or an actuator other than a piezoelectric element, such as a vibration motor, may be used as a vibrator that produces sound by causing vibration of the touchscreen display panel P1 based on the sound signal SG4. Moreover, a sensor other than a piezoelectric element, such as a strain gauge, may be used as the pressure detector that detects a pressure on the touchscreen display panel P1.

In the foregoing embodiment, the piezoelectric element 4 functions as the vibrator that produces sound by causing vibration of the touchscreen display panel P1 based on the sound signal SG4, and also as the vibrator that causes vibration of the touchscreen display panel P1 based on the haptic feedback signal SG2. However, a vibrator may be provided to produce sound by causing vibrations of the touchscreen display panel P1 based on the sound signal SG4, and another vibrator is provided to cause vibrations of the touchscreen display panel P1 based on the haptic feedback signal SG2. In a case where different vibrators are provided, a same type of vibrators may be used, or different types of vibrators may be used.

Further, in the foregoing embodiment, the sound output apparatus has the configuration including the touchscreen display panel P1. However, the sound output apparatus may include no display panel. In a case where the sound output apparatus does not include a display panel, vibration is caused, based on a sound signal, to a touchscreen (an input device, so-called "touch pad") that is not layered on the display panel.

While the invention has been shown and described in detail, the foregoing description is in all aspects illustrative and not restrictive. It is therefore understood that numerous other modifications and variations can be devised without departing from the scope of the invention.

What is claimed is:

1. A sound output apparatus comprising:
   a touchscreen;
   a vibrator that produces sound by causing vibration of the touchscreen based on a sound signal; and
   a controller that (a) performs a predetermined control of the sound signal while contact of an operation body with the touchscreen is being detected by the touchscreen, and (b) does not perform the predetermined control of the sound signal while contact of an operation body with the touchscreen is not detected by the touchscreen, wherein
   the predetermined control lowers at least a first band of the sound signal.

2. The sound output apparatus according to claim 1, wherein
   the controller also (a1) performs the predetermined control of the sound signal while an approach of the operation body to the touchscreen is being detected, and (b1) does not perform the predetermined control of the sound signal while an approach of the operation body to the touchscreen is not detected.

3. The sound output apparatus according to claim 1, wherein
   an upper limit of the first band is no greater than 500 Hz.

4. The sound output apparatus according to claim 1, further comprising:
   a display panel that faces the touchscreen.

5. A sound output apparatus comprising:
   a touchscreen;
   a vibrator that produces sound by causing vibration of the touchscreen based on a sound signal; and
   a controller that (a) performs a predetermined control of the sound signal while contact of an operation body with the touchscreen is being detected by the touchscreen, and (b) does not perform the predetermined control of the sound signal while contact of an operation body with the touchscreen is not detected by the touchscreen, wherein
   the controller amplifies at least a second band of the sound signal.

6. The sound output apparatus according to claim 5, wherein
   the second band is greater than 500 Hz.

7. The sound output apparatus according to claim 5, further comprising:
   a display panel that faces the touchscreen.

8. A sound output apparatus comprising:
   a touchscreen;
   a vibrator that produces sound by causing vibration of the touchscreen based on a sound signal; and
   a controller that (a) performs a predetermined control of the sound signal while contact of an operation body with the touchscreen is being detected by the touchscreen, and (b) does not perform the predetermined control of the sound signal while contact of an operation body with the touchscreen is not detected by the touchscreen;
   a pressure detector that detects a pressure applied to the touchscreen; and
   a circuit that superimposes, on a signal output by the pressure detector, i) a signal having an antiphase of the sound signal or ii) a signal having an antiphase of an adjusted sound signal obtained by adjusting the sound signal.

9. The sound output apparatus according to claim 8, wherein
   the circuit superimposes the signal having the antiphase of the adjusted sound signal on the signal output by the pressure detector, and
   the adjusted sound signal is obtained by adjusting the sound signal in accordance with a vibration characteristic of the touchscreen.

10. A sound output method that uses a touchscreen, the sound output method comprising the steps of:
    producing sound by causing vibration of the touchscreen based on a sound signal;
    performing a predetermined control of the sound signal while contact of an operation body with the touchscreen is being detected by the touchscreen; and
    not performing the predetermined control of the sound signal while contact of an operation body with the touchscreen is not detected by the touchscreen, wherein
    the predetermined control: (i) lowers at least a first band of the sound signal, or (ii) amplifies at least a second band of the sound signal.

* * * * *